March 28, 1950 S. B. RADLOVE 2,501,851
ISOMERIZATION OF FATTY OILS
Filed Jan. 21, 1947
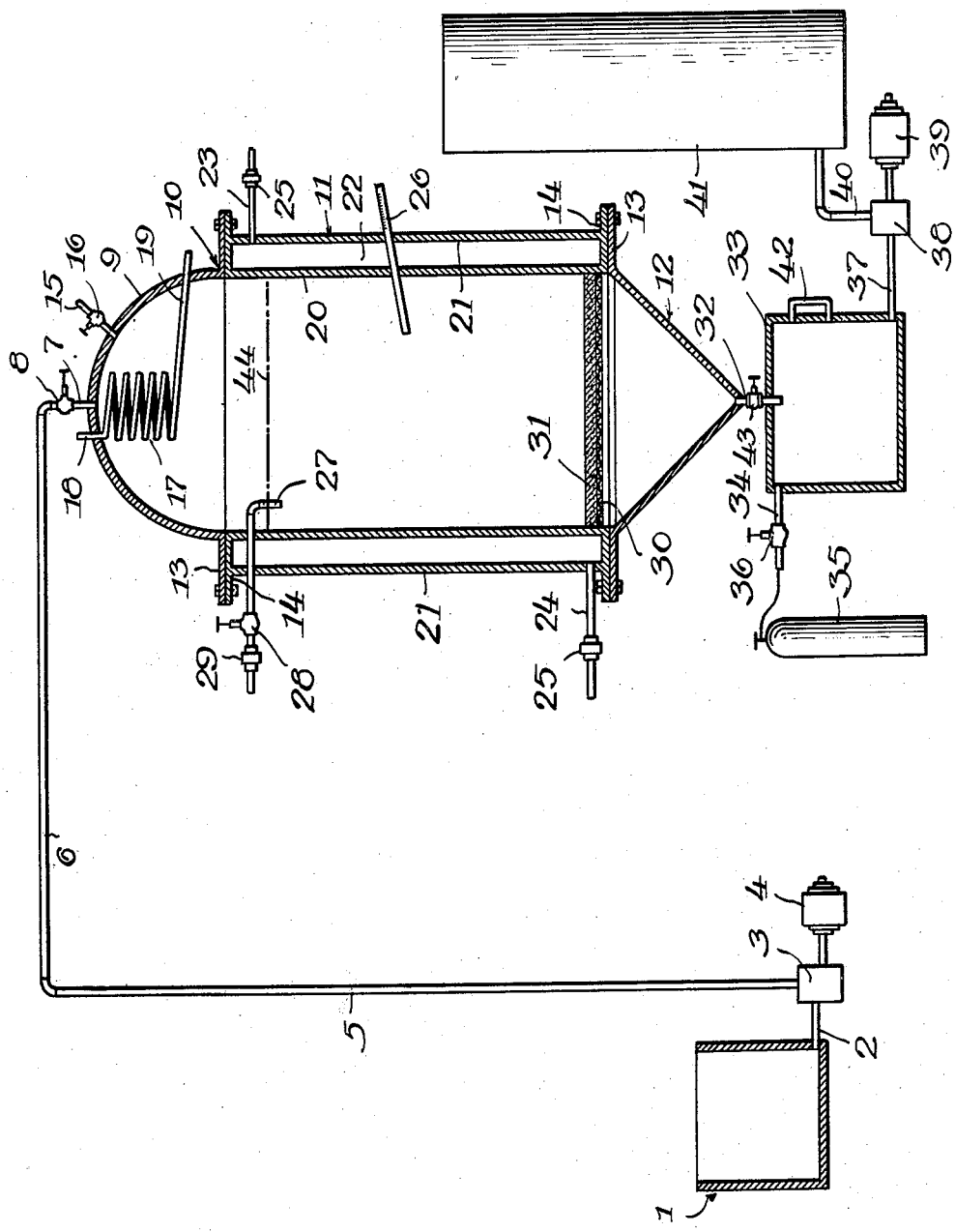
INVENTOR.
Sol B. Radlove,
BY Patented Mar. 28, 1950

2,501,851

UNITED STATES PATENT OFFICE 2,501,851

ISOMERIZATION OF FATTY OILS

Sol B. Radlove, Newton, Iowa, assignor to The Maytag Company, Newton, Iowa, a corporation of Delaware Application January 21, 1947, Serial No. 723,335

4 Claims. (Cl. 260—405.6)

The present invention relates to a method or process for the isomerization of neutral unsaturated organic materials and more particularly to a novel continuous process for isomerizing fatty oils and their neutral derivatives and to novel means and apparatus for carrying out such continuous process. Drying oils such as tung and oiticica oils which contain conjugated double bonds are generally considered as more desirable for use in the preparation of protective coatings than are the non-conjugated drying oils, such as linseed, soybean and perilla oils, for the reason that the conjugated oils are generally faster drying, polymerize on heat treatment at a greater rate, and their films exhibit greater water and alkali resistance. Also, these conjugated oils provide an excellent source of raw material for co-polymerization with other compounds such as styrene and butadiene to form excellent material for the protective coating industry.

Such non-conjugated drying oils may be converted to the conjugated analogs by various methods. For example, linseed oil may be isomerized by treatment with an excess of alkali at high temperatures. I have also found that linseed oil and soybean oil may be isomerized and conjugated by treatment with a nickel on activated carbon catalyst at temperatures of 160° to 200° C. In this latter method the oil to be treated is placed in relatively small quantities or individual batches in kettles along with enough of the nickel on activated carbon catalyst to give approximately 1.5% nickel and 5.0% carbon by weight in each kettle or batch to be treated. The oil and catalyst are intimately mixed by stirring and heated under an inert atmosphere at a temperature of approximately 170° C. for a period of about six hours. The treated oil is then separated from the catalyst by filtration.

Although this batch process is open to numerous and serious objections, no satisfactory substitute therefor has been found for catalytically isomerizing a fatty oil. Among such objections are the following:

1. The total amount of oil which may be conjugated is limited for the reason that 100 pounds of catalyst yields only approximately 5000 pounds of isomerized oil containing 25% to 29% conjugation.

2. Due to the expense involved, the catalyst must be recovered after being filtered from the oil and then re-used in the treatment of a fresh batch of oil. The necessary operations required in filtering and then transferring the catalyst back to the kettle for re-use are both costly and difficult.

3. Great care must be exercised when handling the catalyst for it must be protected from contact with air or oxygen, otherwise it quickly becomes inactive.

4. This catalyst is very difficult to remove from the oil for the reason that the nickel-carbon catalyst is in a finely divided state and the particle size is still further reduced during the isomerization treatment. In fact, a large proportion of these particles during or after treatment approach a colloidal state and difficulty is encountered in filtering.

5. Expensive and special equipment is required to effect such filtering operations, the rates of filtration are extremely slow and the time required for complete separation of the catalyst from the treated oils is excessive.

6. Although filter aids may be added to increase the rate of flow through the filters, such an addition is generally accompanied by a decreased if not complete loss of catalyst activity, besides adding materially to the cost of the process.

7. There is a general decline in catalyst activity as a result of re-use of the catalyst, and with each succeeding batch treatment of fresh oil less conjugation is necessarily obtained. Because of this decline in the degree of catalyst activity it will be obvious that isomerized oils containing like or equal amounts of conjugation and hence of uniform quality are difficult if not impossible to obtain.

All of the above difficulties and disadvantages are readily overcome by the present novel process and manner of treating and isomerizing neutral unsaturated organic materials, and it is, therefore, an object of the present invention to provide a novel continuous process for the isomerizing of fatty oils.

This catalyst and process is also applicable for use in other neutral unsaturated organic materials such as hydrocarbons.

The present invention further comprehends a novel process which entirely eliminates the costly and time consuming filtration operation with its attendant loss of catalyst activity.

Another object of the invention is the provision of a novel process for securing greater yields of isomerized oils containing high percentages of conjugation and of an improved quality at a materially reduced cost of production.

It is a further object of the present invention to provide a novel means and method for producing an isomerized oil of improved and relatively uniform quality.

Another object is to provide a novel process that is simple in operation and highly effective, and one requiring but inexpensive apparatus for carrying out the novel steps of the process.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

The drawing discloses diagrammatically one embodiment of a novel apparatus for practicing the present invention.

In the embodiment disclosed in the drawing, the apparatus selected to illustrate the present invention and the manner of carrying out the steps of the novel process, comprises a supply tank 1 of a size adapted to receive a relatively large quantity of raw oil to be treated and to which fresh oil may be supplied as desired or required in the continuous operation of the process. In the base or bottom of the tank is provided an outlet connected by a pipe or conduit 2 to the intake side of a pump 3 driven by a motor or other prime mover 4.

Connected to the discharge side of the pump 3 is a vertical section of a pipe or conduit 5 attached to a horizontal section 6 leading to a depending section 7 provided with a valve 8 adjacent to where it is connected to a head 9 forming a part of a reaction or isomerization vessel 10. This reaction vessel 10 comprises or is formed of three sections, the head 9, a central section 11 and a bottom section or discharge hopper 12, with the adjacent surfaces of these sections provided with peripheral flanges 13 and 14 adapted to be moved into abutting relation and joined in any suitable manner. This permits these sections to be readily and easily assembled or disassembled for inspection, repair or replacement.

The head section 9 comprises a dome-shaped shell formed of a suitable metal adapted to withstand pressures of approximately 50 pounds per square inch. This shell is provided with an outlet 15 adapted to be controlled by a valve 16. Also provided in the head is a preheater in the form of a steam heating coil 17 having its ends 18 and 19 passing through the head for connection with a suitable source of heat supply.

The central section comprises an inner cylindrical vessel or chamber 20 and an outer encompassing member or enclosure 21 forming therebetween an annular hollow chamber 22 connected adjacent its upper end to a steam inlet pipe 23 and adjacent its lower end with an outlet pipe 24 therefor. Each pipe is preferably provided with a union or nipple 25 permitting quick assembly, disassembly and replacement of this central section when the occasion requires. A thermometer 26 is adapted to project through the walls of the vessel 20 and member 21.

Adapted to discharge into the interior of the vessel or chamber 20 is an intake pipe or conduit 27 controlled by a valve 28 and connected through a union 29 to a suitable source of supply of a catalyst-oil slurry. Rigidly mounted in the base of the central section is a perforated plate or screen 30 adapted to support thereon suitable filtering material 31 and the contents of the vessel or chamber 20.

The bottom section 12 is shaped in the form of a hopper or funnel with the constricted end provided with an outlet conduit 32 discharging into a reservoir or receptacle 33. A flow control valve 43 is preferably disposed in this conduit to control the flow of treated oil entering the reservoir. At one side and to the top of this receptacle is an inlet tube or pipe 34 connected to a cylinder 35 of an inert gas, preferably $CO_2$ or $N_2$, and controlled by a suitable valve 36. An outlet tube or pipe 37 is provided adjacent the base of section 12 and connects with the intake side of a pump 38 driven from a motor or other power source or prime mover 39. From the discharge side of the pump 38 extends a pipe or conduit 40 adapted to discharge into any suitable tank 41 for the treated oil.

All of the sections and parts of the above described apparatus are preferably formed or composed of stainless steel or other suitable non-corrosive material unaffected by the products being treated. Due to the novel construction, arrangement and assembly of the parts, the apparatus may be quickly and easily assembled, disassembled, replaced or repaired.

In preparing the apparatus for carrying out the novel process and the successive steps thereof, a suitable filtering material 31, such as asbestos or the like, is placed on the supporting screen or perforated plate 30 in the central chamber or section 20, after which the top section or dome-like head 9 is mounted and secured in position by the abutting flanges 13 and 14.

In carrying out the novel process, a sufficient supply of raw oil is placed in the supply tank 1 and with the valve 8 open the pump 3 is started to thereby withdraw the raw oil and cause this oil to be forced through the pipes 5 and 6. When all of the air has been displaced from these pipes, the pump 3 is shut off and the valve 8 is closed. The valve 16 is then opened and the system is thoroughly flushed with an inert gas, preferably $CO_2$ or $N_2$, from the cylinder 35 through the pipe 34 and open valve 36. After this flushing of the air from the system has been accomplished, the valve 36 leading from the cylinder 35 and the valve 16 are closed.

A suitable catalyst comprising nickel nitrate ($Ni(NO_3)_2, 6H_2O$) and unground activated carbon (C-190N) is mixed in a ratio of 0.234 of nickel to 1 of carbon by weight, and it is activated by reduction in a current of hydrogen for approximately 2 hours at 350° to 370° C. after which it is cooled and kept under $CO_2$ until ready for use. In order to prevent the nickel on unground activated carbon catalyst from contacting air and thereby destroy a portion of its catalytic ability, it is prior to delivery to the reaction chamber 20 mixed with oil to form a slurry. However, other means for the transferring and admitting the catalyst to the reaction chamber may be provided. Unlike ground activated carbon where the mass is reduced to a finely divided state and the comminuted particles are of approximately uniform size, in unground activated carbon the particle size has not been altered from its original state after being formed and treated. Thus in the unground activated carbon employed in the present invention, the particle size is non-uniform and varies from relatively large to relatively small particles which permit the oil being treated to trickle through the catalyst bed.

The catalyst-oil slurry is then forced into the system from a supply thereof by opening the control valve 28 and discharging the slurry through the outlet 27 into the receptacle or chamber 20. When a sufficient amount of this catalyst-oil slurry has been forced into the system to fill the chamber 20 to the desired depth or amount indicated at 44, the valve 28 is closed and steam is then introduced into the preheater 17 and also through the pipe or conduit 23 into the annular space 22 encompassing the chamber 20 to heat the catalyst-oil slurry to approximately 170° to 175° C. If desired, the preheater coil 17 may be extended down in the chamber 20 to heat and maintain the central portion supplied with heat.

When the system is at equilibrium (temperatures of approximately 170° to 175° C.), the pump 3 is again started and the raw oil from the supply tank 1 is forced over the preheater whereby it is heated to the above mentioned temperature then through the catalyst bed in the chamber 20 and isomerized. In the operation the steam in the space 22 acts to prevent loss of heat during the reaction process. The isomerized oil then passes through the filtering material 31, perforated plate or screen 30 and into the lower section 12 from where it drains through the outlet pipe 32 and the valve 43 into the reservoir 33. A gauge 42 is preferably provided in a wall of the reservoir or receptacle 33 for checking the oil level therein. When sufficient oil has been collected in the reservoir, the pump 38 is operated and it pumps the treated oil through the outlet 37 and pipe or conduit 40 into a storage tank or other receptacle 41. The speed of the pump is preferably adjusted so that a constant level of oil is maintained in the reservoir 33.

In carrying out the steps of the process the rate of flow of the raw oil is so adjusted that sufficient contact time is obtained between the oil and catalyst for isomerization, which will in this instance average from approximately 16 to 20 hours and this process operates continuously for the life of the catalyst. The apparatus is so arranged, constructed and assembled that when the catalyst loses its activity the center section containing such catalyst may be removed and then replaced with a similar section and the operations repeated with a fresh charge of catalyst. The spent catalyst is then removed from the disassembled section and this section is then again ready for reassembly in the unit.

With this process, assuming a constant temperature and rate of flow, when a fresh or new batch of nickel on unground activated carbon catalyst is utilized to isomerize the oil, the conjugation will be approximately 38% and after continuous use this percentage gradually drops until it reaches a value below which the conjugation obtained is not sufficient to warrant continued use. In other words, the length of time that the oil is in contact with the catalyst will have a bearing on the amount of conjugation. If a conjugation of 25% is desired the higher and lower conjugated oils may be blended to maintain a substantially constant percentage. If in some instances the higher conjugated oils bring a premium price, this may be removed and kept separate from the lower conjugated oils. However, under normal conditions and in order to produce as large a quantity of oil of uniform quality as possible the rate flow of oil through the reaction chamber or the reaction temperature may be varied. Assuming a constant temperature in the reaction chamber and that a constant conjugation of 25% is desired, the rate of flow will initially be relatively fast so that the oil will be in contact with the catalyst for a relatively short time. As the activity of the catalyst drops through continued use the rate of flow is reduced proportionally to thereby effect a longer contact of the oil and catalyst to yield the desired 25% conjugation. This gradual reduction of flow is controlled in any suitable manner, and continues until it is no longer economical to utilize the catalyst.

Likewise, if the rate of flow is substantially constant the temperature in the reaction zone may be varied; that is, when the process is initially started the reaction temperature may be reduced to approximately 150° C. to maintain a constant conjugation of 25% and it is gradually increased as the catalytic activity decreases until the temperature reaches approximately 180° C., after which the flow of oil is stopped and a new section replaces the spent unit. It can also be seen that a combination of these two control systems may be employed to accomplish the desired result.

The inactive catalyst is removed from the chamber and is treated to remove the entrained oil and then the catalyst is acid extracted to thereby recover the nickel for further use.

By reason of this novel construction of apparatus and process, I have found that more than twice the amount of oil may be isomerized or conjugated with an equal amount of catalyst than has heretofore been possible by using the batch process referred to above; that is, with 100 pounds of nickel on unground activated carbon catalyst, the yield is increased from 5000 to 10,000 pounds before it becomes necessary to replace the catalyst.

If this nickel on unground activated carbon catalyst is utilized for isomerizing hydrocarbons the hydrocarbon when treated may be in either the liquid or vapor phase. The operating temperatures of the reaction chamber may be reduced to a certain extent because some hydrocarbons volatilize at relatively low temperatures.

It will be evident to those skilled in the art that numerous changes may be made without departing from the spirit and scope of the invention. For example, although I have mentioned that the reaction chamber and the preheater employ steam as the heating fluid, it will be apparent that any other suitable heating means or heating fluid, including diphenyl oxide and the like may be employed. Also it may be desirable to insulate the reaction chamber. Likewise the pressure under which the system is operated and the rate of flow of the oil may be accomplished through a relatively wide range, the appropriate pressure and rate of flow being readily secured by means of the pump 3 and the valve 43. As for the reaction or isomerization chamber, the details thereof may be varied so long as the oil is preheated to the desired or required temperature before entering the catalyst bed, and that sufficient contact time between the oil and catalyst is maintained so as to obtain the desired amount or degree of conjugation. Also, by employing a continuously operating refractometer or the like for checking the treated material as it flows from the reaction chamber, the desired conjugation may be maintained relatively constant by increasing or decreasing its rate of flow or by varying the temperature in the reaction chamber; this control being preferably automatic and responding to the condition of the treated product.

While I have referred in the disclosure to the use of soybean and linseed oils in carrying out the novel process, it is to be understood that the invention is adapted for use with other non-conjugated oils or neutral unsaturated organic compounds or any neutral derivatives thereof, including esters, alcohols, nitriles and the like.

Having thus disclosed my invention, I claim:

1. The process of isomerizing fatty oils, comprising the steps of maintaining a supply of oil to be treated, continuously pumping a stream of oil from the supply through a mass of nickel on unground activated carbon catalyst in an isomerization zone and under an inert atmosphere, said catalyst being in a ratio of approximately 0.2 of nickel to 1 of carbon by weight, heating the oil and catalyst in said zone to isomerization temperatures of approximately 150° to 200° C., and discharging and collecting the treated oil.

2. The process of isomerizing glyceride oils in a reaction space in which the oil to be treated is discharged under pressure into the upper portion of the space, thereat preheating the oil, passing the preheated oil downwardly through a catalyst in an isomerization zone and collecting the treated oil at the lower portion of the space, comprising the steps of flushing air from the space and the passage for the oil to be treated, supplying the isomerization zone with a catalyst-oil slurry, preheating the oil and heating the interior of the space to a temperature of approximately 170° to 175° C., continuously forcing the preheated oil to be treated under pressure through the catalyst to isomerize the oil, conducting the isomerization under an inert atmosphere, and collecting the treated oil.

3. The process of isomerizing glyceride oils in a system including a reaction space in which the oil to be treated is discharged under pressure into the upper portion of the space, preheated and passed downwardly through a catalyst in an isomerization zone to be collected from the bottom of the zone, comprising the steps of flushing air from the system, supplying the isomerization zone under an inert atmosphere with a nickel on unground activated carbon catalyst-oil slurry, preheating the oil to be treated and heating the interior of the space to a temperature of approximately 170° to 175° C., and continuously forcing the oil to be treated under pressure and at isomerization temperatures of approximately 150° to 200° C. through the catalyst to isomerize the oil.

4. The process of isomerizing glyceride oils in a system including a reaction space in which the oil to be treated is discharged under pressure into the upper portion of the space, preheated and passed downwardly through a catalyst in an isomerization zone to be collected from the bottom of the zone, comprising the steps of partially filling the isomerization zone under an inert atmosphere with a nickel on unground activated carbon isomerization catalyst with the catalyst mixed in a ratio of approximately 0.2 of nickel to 1 of carbon by weight, heating the zone to isomerization temperatures of approximately 150° to 200° C., and continuously forcing the oil to be treated under pressure through the catalyst.

SOL B. RADLOVE.

REFERENCES CITED

The following references are of record in the file of this patent:

UNITED STATES PATENTS

| Number | Name | Date |
|---|---|---|
| 1,071,221 | Ellis | Aug. 26, 1913 |
| 1,084,258 | Ellis | Jan. 13, 1914 |
| 1,121,860 | Moore | Dec. 22, 1914 |
| 1,238,774 | Ittner | Sept. 4, 1917 |
| 1,374,589 | Levey | Apr. 12, 1921 |
| 2,340,745 | Hanford et al. | Feb. 1, 1944 |
| 2,389,260 | Kirschenbauer | Nov. 20, 1945 |

OTHER REFERENCES

Berkman et al., Catalysis, page 449, Reinhold Publishing Co. (1940).

"Catalysis" by Berkman et al., pp. 450–451, Reinhold Publishing Co. (1940).